(12) United States Patent
Takakura

(10) Patent No.: US 8,210,457 B2
(45) Date of Patent: Jul. 3, 2012

(54) SCRAP SHEARING MACHINE

(75) Inventor: Yoshiaki Takakura, Toyama (JP)

(73) Assignee: Kabushiki Kaisha Towani, Toyama-Shi (JP)

( * ) Notice: Subject to any disclaimer, the term of this patent is extended or adjusted under 35 U.S.C. 154(b) by 248 days.

(21) Appl. No.: 12/668,124

(22) PCT Filed: Jul. 10, 2008

(86) PCT No.: PCT/JP2008/062516
§ 371 (c)(1),
(2), (4) Date: Jan. 7, 2010

(87) PCT Pub. No.: WO2009/008483
PCT Pub. Date: Jan. 15, 2009

(65) Prior Publication Data
US 2011/0000991 A1    Jan. 6, 2011

(30) Foreign Application Priority Data

Jul. 10, 2007  (JP) ................................. 2007-180936

(51) Int. Cl.
*B02C 18/22* (2006.01)
(52) U.S. Cl. ....................................... 241/36; 241/101.2
(58) Field of Classification Search .................... 241/36, 241/101.2; 83/437.3
See application file for complete search history.

(56) References Cited

U.S. PATENT DOCUMENTS

| | | | | |
|---|---|---|---|---|
| 3,101,045 A | * | 8/1963 | Endert | 100/233 |
| 3,945,315 A | * | 3/1976 | Dahlem et al. | 100/95 |
| 3,994,326 A | * | 11/1976 | Sarten | 144/136.1 |
| 4,188,876 A | * | 2/1980 | Graves | 100/232 |
| 4,202,263 A | * | 5/1980 | Schulte | 100/95 |
| 4,253,388 A | * | 3/1981 | Vezzani | 100/39 |
| 4,727,786 A | * | 3/1988 | Quante et al. | 83/404.2 |
| 6,352,012 B1 | * | 3/2002 | Borzym et al. | 83/186 |

FOREIGN PATENT DOCUMENTS

| | | |
|---|---|---|
| JP | 49-19304 B1 | 5/1974 |
| JP | 49-22740 B1 | 6/1974 |
| JP | 51-4684 A | 1/1976 |
| JP | 54-17585 A | 2/1979 |
| JP | 2-24016 A | 1/1990 |

OTHER PUBLICATIONS

International Search Report issued in connection with International Application No. PCT/JP2008/061516 dated Aug. 26, 2008.

* cited by examiner

*Primary Examiner* — Faye Francis

(74) *Attorney, Agent, or Firm* — Holtz, Holtz, Goodman & Chick, PC

(57) ABSTRACT

A scrap shearing machine includes a straight-blade shear-stand, an open-wide feed channel, a side hydraulic ram for squashing a metal scrap sideways in the feed channel, and a feeder for feeding the squashed metal scrap into the mouth of the shear-stand. In order to squash a long-rigid metal scrap by relatively small drive force, the side ram is adapted to squash the scrap sideways only at a certain limited section which is shorter than the overall length of the scrap in the longitudinal direction of the feed channel. A downward hydraulic ram is associated with the side ram and is adapted to downwardly squash the scrap only at the limited section prior to squashing operation of the side ram. A control unit controls the respective drive systems of the shear-stand, the feeder, the side ram, and the downward ram, in a predetermined operation sequence.

9 Claims, 5 Drawing Sheets

SCRAP SHEARING MACHINE

This application is a U.S. National Phase Application under 35 USC 371 of International Application PCT/JP2008/062516 filed Jul. 10, 2008.

TECHNICAL FIELD

The present invention generally relates to a scrap shearing machine for shearing a long-rigid metal scrap into a plurality of short scrap pieces. More particularly, the present invention relates to a scrap shearing machine comprising a guillotine-type straight-blade shear-stand, an open feed channel which forms a parallelepiped space having a width greater than that of the mouth of the shear-stand, a side hydraulic ram for squashing the metal scrap sideways in the feed channel before feeding it into the mouth of the shear-stand, and a feeder for feeding the metal scrap into the mouth of the shear-stand after the scrap has been squashed sideways by the side hydraulic ram in the feed channel.

BACKGROUND ART

Patent Document 1 discloses a scrap shearing machine of this kind for handling scrap in the form of cylindrical containers and pipes of large-diameter, in which the scrap is squashed from the side to reduce its width and then sheared into short pieces by means of a guillotine-type straight-blade shear-stand.

Patent Document 1: U.S. Pat. No. 3,945,315

This known scrap shearing machine uses an open feed channel which is wider than the mouth of the shears. On one of sideways along a longitudinal direction of the feed channel, there is provided a side hydraulic ram for squashing the scrap sideways to reduce its width before feeding it into the comparatively narrow mouth of the shears. The side hydraulic ram comprises a main ram and an auxiliary ram. The auxiliary ram can be operated in advance independently of the main ram. The working face of the auxiliary ram is situated adjacent to the mouth of the shears and is shorter than the working face of the main ram in the feed channel. Therefore, with respect to the longitudinal direction of the feed channel, the sum of lengths of the working faces of the auxiliary ram and the main ram corresponds to the full length of the box-shaped feed channel. The scrap shearing machine also comprises a down thrust plate provided in a pivoted manner which covers the full length of the channel along a sidewall of the channel on one side to which the side hydraulic ram is opposed. The down thrust plate is driven by a hydraulic cylinder which is pivoted by a pin on an arm fixed to the machine frame at the one side for holding down the scrap to prevent it from bulging upward along the full length of the channel before the scrap enters the mouth of the shears.

With such a conventional scrap shearing machine, in order to shear, into short scrap pieces, a relatively large, long, and rigid metal scrap, for example, discarded land vehicles such as railroad coaches including a freight car and a passenger car, large-sized automobiles including a limousine and a heavy-duty truck or architectural scrap including section steels, the box-shaped feed channel also must be constructed to have a suitably long, wide and deep dimension for being able to handle such a large-long metal scrap. In order to squash a rigid metal scrap occupying almost all the length of such a long, wide and deep feed channel by the downward thrust plate and side hydraulic ram comprising the main ram and the auxiliary ram covering the full length of the feed channel, there is required an extremely powerful hydraulic cylinder for driving each of the rams and thrust plate.

DISCLOSURE OF THE INVENTION

Problem to be Solved by the Invention

The main object of the present invention is to provide a scrap shearing machine suitable for shearing relatively large, long, and rigid metal scrap, in particular, discarded land vehicles such as railroad coaches including a freight car and a passenger car, large-sized automobiles including a limousine and a heavy-duty truck or architectural scrap including section steels, into a plurality of short scrap pieces. In this case, it is necessary to reduce the driving power for both means for squashing scrap sideways and downwardly in the open feed channel which is wider than the mouth of the shears.

Means for Solving the Problem

According to the present invention, the object can be achieved by the scrap shearing machine characterized in that the side hydraulic ram is situated adjacent to the mouth of the shear-stand and is adapted to squash the metal scrap in front of the mouth only at a certain limited longitudinal section which is shorter than the overall length of the scrap in the longitudinal direction of the feed channel so as to squash the metal scrap to a final width no greater than the inside width of the mouth; that a downward hydraulic ram is associated with the side hydraulic ram adjacent to the mouth of the shear-stand and is adapted to downwardly squash the metal scrap in front of the mouth only at a certain limited longitudinal section which is shorter than the overall length of the scrap in the longitudinal direction of the feed channel prior to squashing-operation of the side hydraulic ram so as to squash the metal scrap to a final height no greater than the inside height of the mouth of the shear-stand; and that a control unit is associated with respective drive systems of the shear-stand, the feeder, the side hydraulic ram, and the downward hydraulic ram for supervising and controlling them in accordance with a predetermined operation sequence.

According to the present invention, the scrap shearing machine is suitably used for shearing, into a plurality of short scrap pieces, relatively large, long, and rigid metal scraps, in particular, discarded land vehicles such as railroad coaches including a freight car and a passenger car, large-sized automobiles including a limousine and a heavy-duty truck and architectural scrap including section steels. Upon placed in the feed channel, the metal scrap is squashed in front of the mouth of the shear-stand only at a certain limited longitudinal section which is shorter than the overall length of the scrap, by the downward hydraulic ram and side hydraulic ram respectively equipped to one end of the open feed channel which is wider than the mouth of the shear-stand, to a cross section dimension having a final height no greater than the inside height of the mouth and a final width no greater than the inside width of the mouth. Therefore, the driving torque of the hydraulic rams is obviously reduced as compared to the case of the conventional scrap shearing machine technology, and each of the rams can be driven by a relatively small diameter hydraulic power cylinder. Respective drive systems of the straight-blade shear-stand, the feeder, the side hydraulic ram, and the downward hydraulic ram are supervised and controlled by the control unit in accordance with a predetermined operation sequence. Thus, by means of the straight-blade shear-stand, a plurality of short scrap pieces can efficiently be cut out from the large, long, and rigid metal scrap and they can be transferred to a recycle facility equipped with a shredding machine for sorting and collecting of resource materials.

According to a preferred embodiment of the present invention, the downward hydraulic ram is driven by the vertical hydraulic cylinder and the side hydraulic ram is driven by the horizontal hydraulic cylinder. On the bottom face of the downward hydraulic ram, and on the top face of the side hydraulic ram, respective linear guides which slidably fit with each other are provided. Thereby, between the side hydraulic ram and the downward hydraulic ram which is descended in advance to the movement of the side hydraulic ram, a stable linear movement of the side hydraulic ram is ensured by the linear guides so that the adverse resistance load to the driving hydraulic cylinder is also avoided. Thus, favourable sideways-squashing operation is achieved, reducing malfunctions of the squashing machines.

The downward hydraulic ram is designed to downwardly squash the metal scrap in front of the mouth only at a certain limited longitudinal section which is shorter than the overall length of the scrap in the longitudinal direction of the feed channel prior to squashing operation of the side hydraulic ram so as to squash the metal scrap to a final height no greater than the inside height of the mouth of the shear-stand. Although the drive system of the downward ram may be constituted by an electrically driven mechanism, it is preferably for the drive system to be composed of a hydraulic piston-cylinder unit. It is advantageous for the downward hydraulic ram to be provided with an auxiliary weight for assisting the downward squashing force by the vertical hydraulic cylinder.

The side hydraulic ram is designed to be operated after completion of the squashing operation by the downward hydraulic ram to squash the metal scrap sideways in front of the mouth only at a certain limited longitudinal section which is already squashed downwardly by the downward hydraulic ram and is shorter than the overall length of the scrap in the longitudinal direction of the feed channel so as to squash the metal scrap to a final width no greater than the width of the mouth of the shear-stand. Although the drive system of the side ram may be constituted by an electrically driven mechanism, it is preferably for the drive system to be composed of a hydraulic piston-cylinder unit. Needless to say, in order to apply a stronger squashing force, a plurality of horizontal hydraulic cylinders may drive a single side ram.

The contour shape of the transverse cross section of the metal scrap squashed by the downward and side hydraulic rams may preferably have a dimension smaller than the inside dimension of the mouth of the shear-stand. This is because when the compression state by each of the hydraulic rams is released, the squashed portion expands due to a spring-back action and this expansion gradually increases. Taking such expansion by the spring-back action into consideration, the final stroke of squashing by each of the hydraulic rams may preferably reach a position at which the transverse cross-sectional dimension of the squashed portion of the metal scrap becomes smaller than the inside dimension of the mouth of the shear-stand that much.

The expansion caused by the spring-back action of the squashed metal scrap depends on materials and shape of the metal scrap to be squashed. In many cases, scrap metal processors can grasp the amount of the spring-back expansion by experience from the type of the metal scrap to be handled. Therefore, it is preferred that the control unit has functions for variably set conditions, such as the driving torque of downward and side hydraulic rams, compression holding time, and the number of times of re-compression.

According to another preferred embodiment of the present invention, the feeder comprises a hydraulic pusher which performs reciprocating movement from a tail end face of the feed channel toward the mouth of the shear-stand, and vice versa.

The feeder is not limited to the hydraulic pusher. Other feeder machines which feed, toward the mouth of the blade shear-stand, the metal scrap placed in the feed channel, such as an electric-powered lead screw and an endless-chain conveyor, may be used.

According to still another preferred embodiment of the present invention, the scrap shearing machine further comprises a pair of sheathing boards which extend upward along both the sidewalls of the feed channel. The sheathing boards extend along both the sidewalls of the feed channel upward, and each of their upper edges at least reaches a height equivalent to the initial standby position (ascent position) of the downward hydraulic ram.

In this regard, it is preferable that a frame for supporting the downward hydraulic ram and the hydraulic cylinder for driving it also is provided with closing walls which cover both the side faces of the frame. While the metal scrap placed in the feed channel is being squashed particularly by the side hydraulic ram, the sheathing boards and the closing walls prevent the metal scrap from escaping out of the feed channel. As in the case of the sheathing boards, it will also serve the purpose if the closing walls cover at least a region of both the sides of the frame lower than an initial standby position (ascent position) of the downward hydraulic ram.

The scrap shearing machine of the present invention comprises the control unit, which supervises and controls respective drive systems of the straight-blade shear-stand, the feeder, the side hydraulic ram, and the downward hydraulic ram in accordance with a predetermined operation sequence.

According to one preferred embodiment of the present invention, the control unit includes a sequence controller. The sequence controller performs steps, namely, a control sequence in which the steps are sequentially repeated as follows:

a) a downward press step for driving the downward hydraulic ram to squash the metal scrap in front of the mouth only at a certain limited longitudinal section which is shorter than the overall length of the scrap in the longitudinal direction of the feed channel prior to squashing operation of the side hydraulic ram so as to squash the metal scrap to a final height no greater than the inside height of the mouth of the shear-stand;

b) a side press step for driving the side hydraulic ram to squash the metal scrap in front of the mouth only at the limited longitudinal section which is shorter than the overall length of the scrap in the longitudinal direction of the feed channel after squashing operation of the downward hydraulic ram so as to squash the metal scrap to a final width no greater than the inside, width of the mouth of the shear-stand;

c) a feeding step for driving the feeder to feed the metal scrap toward the mouth of the shear-stand after the metal scrap has been squashed both downward and sideways in the feed channel; and e) a shearing step for driving scrap shears of the shear-stand to cut the front end portion of the metal scrap fed to the mouth of the shear-stand into a short scrap piece.

For example, when the metal scrap has been carried into the feed channel, by a start command of a worker checking it, the control unit starts controlling the operation of the scrap shearing machine. In this regard, the worker may visually make sure that the metal scrap has been carried in and manipulate the start switch. Alternatively, the operation control may be automatically started when the metal scrap of predetermined weight has been carried into the feed channel.

Upon receipt of the start command, first, the control unit drives the feeder to move the metal scrap until the front end of the metal scrap in the feed channel reaches the mouth of the shear-stand. According to one preferable embodiment of the present invention, the driving torque of the feeder or the pressure in the hydraulic circuit of the hydraulic feeder is measured and monitored by the control unit associated with a sensor. When the measured value from the sensor exceeds the predetermined threshold value, it is judged that the front end of the metal scrap has reached the mouth of the shear-stand, and a corresponding signal is initiated by the control unit. Then, a subsequent downward press step is started.

In the downward press step, by the downward hydraulic ram, only a certain limited longitudinal section of the metal scrap in front of the mouth is squashed downward to a final height which is not greater than the inside height of the mouth of the shear-stand. In this regard, an operation of the downward hydraulic ram is given an interlock so as to ensure the absence of the feeder and side hydraulic ram in the descending region, thereby the mutual mechanical interference between them is avoided. The descending stroke end of the downward hydraulic ram corresponds to a height level of a top face of the side hydraulic ram. Because of the reason already described, the descending stroke end is located below the upper edge level of the mouth of the shear-stand. When the downward hydraulic ram arrives at the descendent stroke end, the downward hydraulic ram is latched to that position, and completion of the latching will be detected by, for example, a limit switch. The detection signal by the limit switch is given to the control unit thereby the control sequence is changed to the following side press step.

In the side press step, only the limited longitudinal section of the metal scrap in front, of the mouth, which is held in a state where it is already squashed downwardly by the downward hydraulic ram, is squashed sideways to a final width no greater than the inside width of the mouth of the shear-stand. In this case also, the operation of the side hydraulic ram is interlocked for ensuring the absence of the feeder in the moving range of the side hydraulic ram thereby the mutual mechanical interference between the feeder and the side hydraulic ram is avoided. According to one preferred embodiment of the present invention, there are provided mutually slidably fitting linear guides in the bottom face of the downward hydraulic ram which is latched to the descending stroke end and on the top face of the side hydraulic ram entering sideways beneath the downward hydraulic ram, thereby causing no shift in the forward moving direction of the side hydraulic ram during the side press step. The forward stroke end of the side hydraulic ram in the side press step is selected to an inner position of the inside width of the mouth of the shear-stand so that, even if the expansion due to the springback of the compressed metal scrap occurs when the compression by the side hydraulic ram is released, the width dimension of the squashed portion still stays within the inside width of the mouth of the shear-stand. The control unit is adapted to monitor the arrival of the side hydraulic ram at its forward stroke end during the side press step. When the side hydraulic ram arrives at its forward stroke end, a detection signal is given from another limit switch to the control unit, thereby the side hydraulic ram and the downward hydraulic ram are sequentially returned to respective initial positions. Consequently, the control sequence is changed to the next feeding step which is followed by the shearing step.

In the feeding step, the feeder is driven, and the metal scrap in the feed channel is fed from its front end into the mouth of the shear-stand. During the feeding step also, as already described, the driving torque of the feeder or the pressure in the hydraulic circuit thereof is measured and monitored by the control unit with the associating sensor. In the case where the front end of the feeder has not reached the stroke ranges of the downward hydraulic ram and the side hydraulic ram, when the detection signal of the sensor exceeds the predetermined threshold value, it is judged by the control unit that an uncompressed portion of the metal scrap has reached the mouth of the shear-stand. Then, the driving of the feeder is suspended by the control unit having received the sensor signal, and the control sequence is resumed from the downward press step. When the front end of the feeder enters into the stroke ranges of the downward hydraulic ram and the side hydraulic ram, a signal by the above-described interlock is given to the control unit. Accordingly, before the operation of either one of the downward hydraulic ram and the side hydraulic ram is started, the feeder is made to move backward and to retract from the above stroke ranges. When the feeder has retracted, the control sequence is changed to the downward press step, and then changed to the final side press step. When the final side press step is over, each hydraulic ram is returned to the initial position, and then the final feeding step and shearing step are performed. This repetitive control is completed when the front end of the feeder reaches the mouth of the shear-stand. Then, all the movable parts are returned to their initial positions to be ready for the next metal scrap to be placed in the feed channel.

Further, it may be such that the feed amount of the metal scrap by the feeder is measured during the shearing step and the control sequence may be resumed from the downward press step when the measured feed amount has reached the length of the limited longitudinal section. In this way, the function of the limit switches can be substituted with a software program.

In the shearing step, the front end portion of the metal scrap, which is squashed downward and sideways and being fed into the mouth of the shear-stand by the feeder, is cut into a short scrap piece by upper and lower blades of the scrap shears while being sequentially clamped by a hydraulic stamper installed in front of the scrap shears within the shear-stand. Every time one short scrap piece is cut out, a corresponding signal is given to the control unit. Thereby, the clamping by the hydraulic stamper is released and the upper blade of the shears is returned to its ascent position. Subsequently, the remaining metal scrap is fed forward by the feeder. In a similar way, the next short scrap piece is cut out from the remaining metal scrap.

The foregoing and other features and advantages of the present invention will be more apparent from the following description of preferred embodiments as illustrated in the accompanying drawings.

BEST MODE FOR CARRYING OUT THE INVENTION

Figure 1:
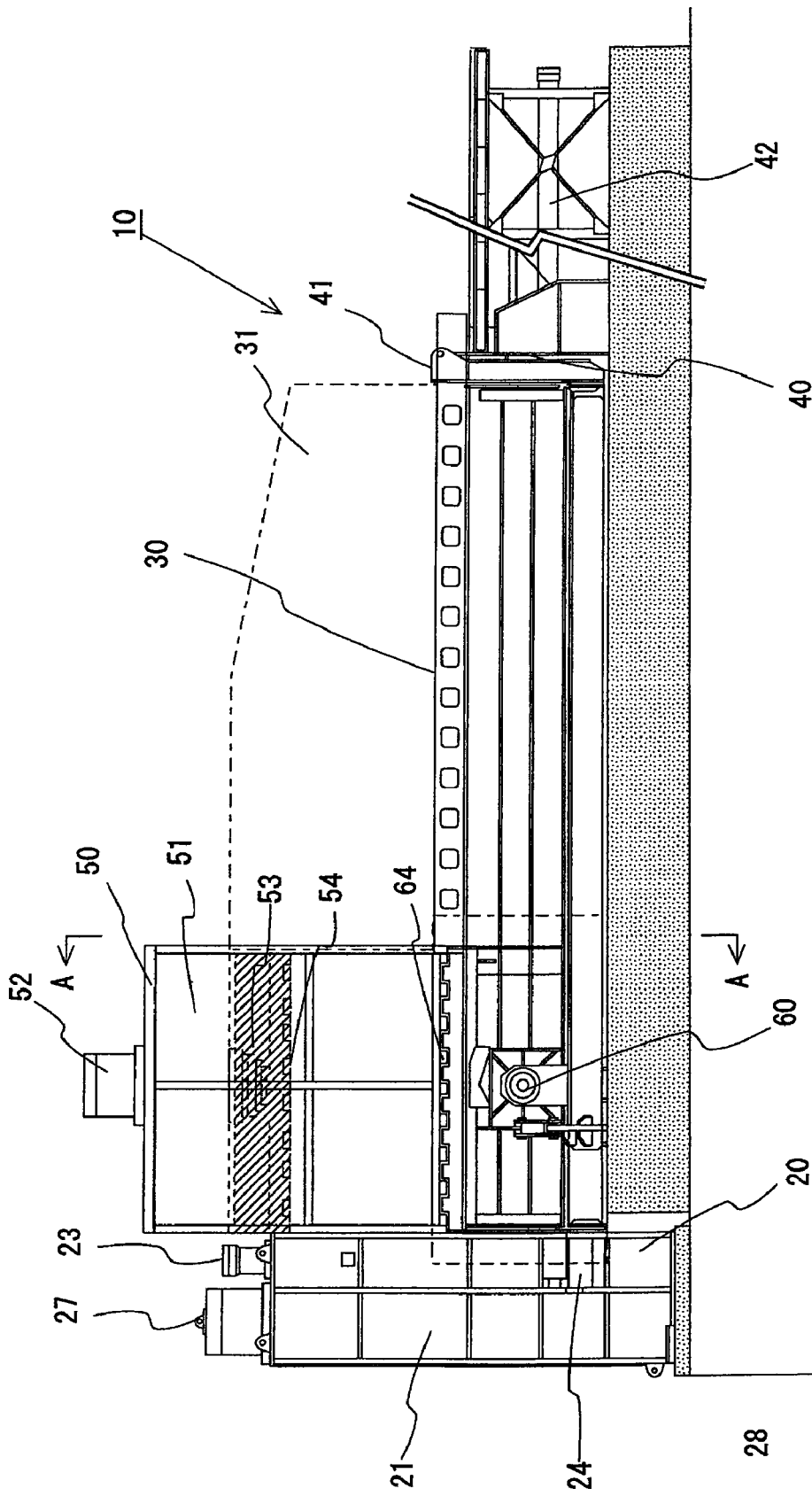
FIG. 1 is a schematic front view of the scrap shearing machine according to one embodiment of the present invention.
Figure 2:
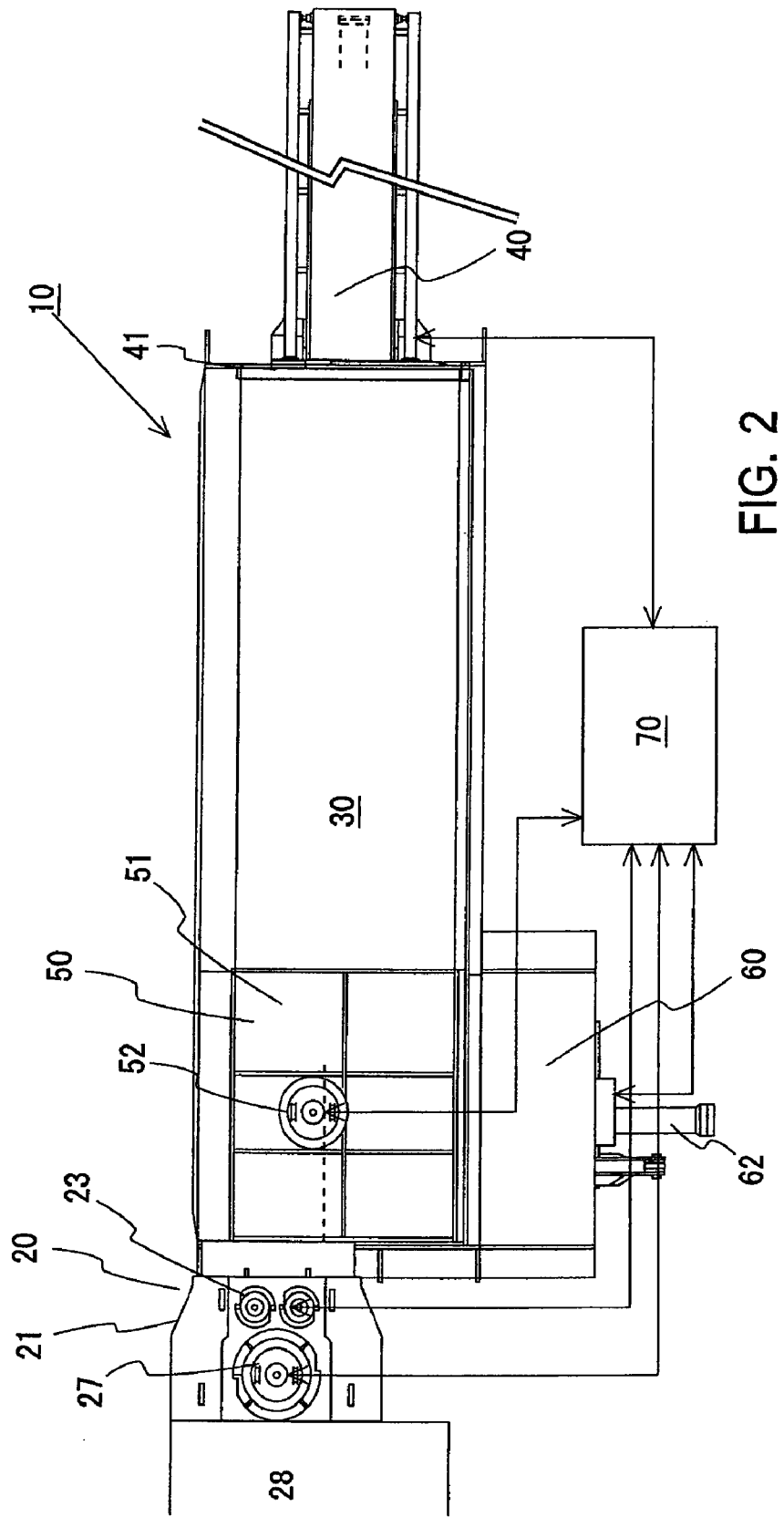
FIG. 2 is a schematic plan view of the machine of FIG. 1.
Figure 3:
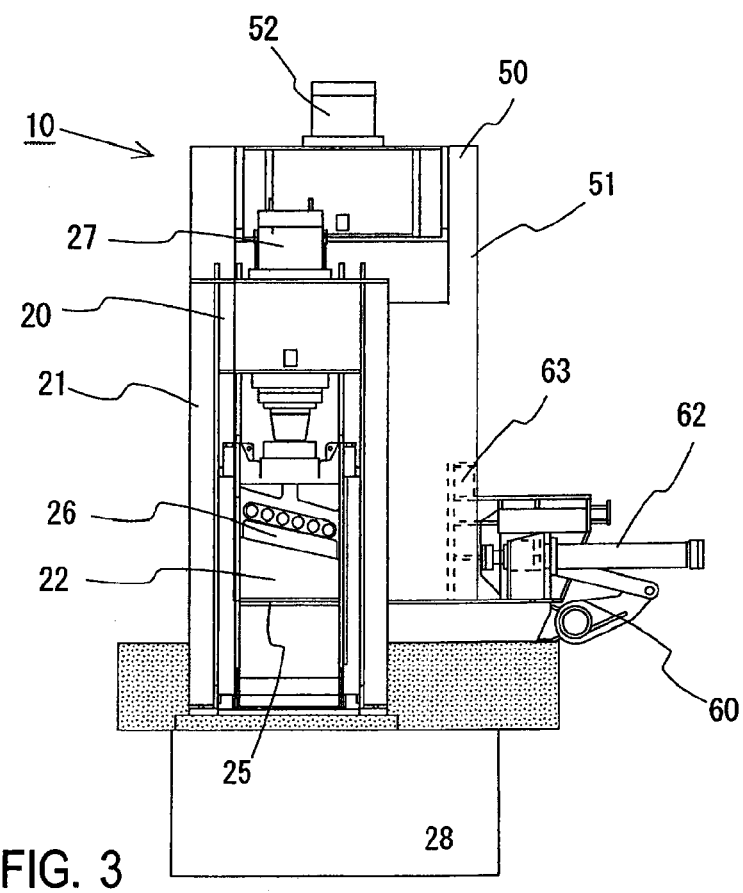
FIG. 3 is a schematic left side view of the machine of FIG. 1.
Figure 4:
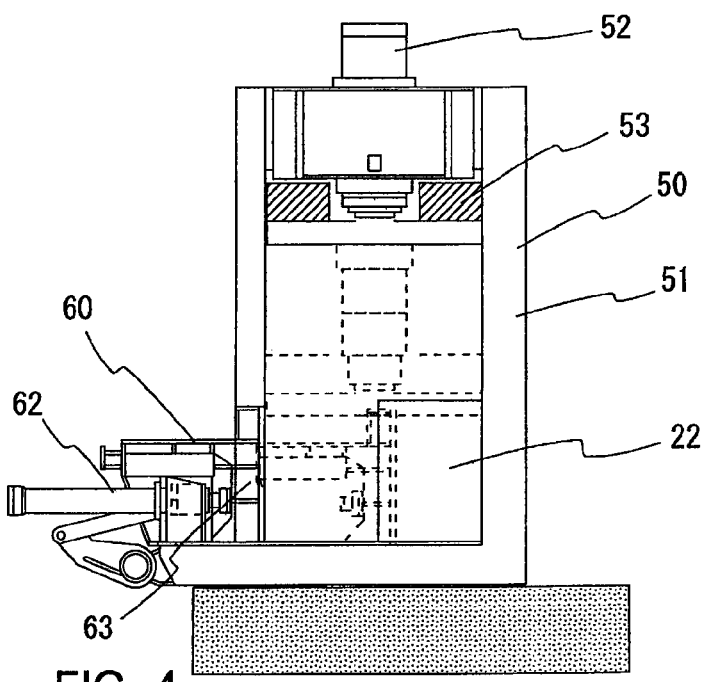
FIG. 4 is a section taken in the plane A-A of FIG. 1.

As shown in the drawings, the scrap shearing machine 10 comprises an open feed channel 30 having two opposite sidewalls to form a rectangular parallelepiped space, a guillotine-type straight-blade shear-stand 20 at one end of the feed channel and having scrap shears and a mouth 22 narrower than the normal width of the feed channel 30 between said sidewalls, a side hydraulic ram 63 for moving at least one of said sidewalls towards the other of said sidewalls whereby the metal scrap 35 placed in the feed channel 30 can be squashed sideways before feeding the metal scrap into the mouth of the shear-stand, and a feeder 40 for feeding the metal scrap 35 into the mouth 22 of the shear-stand 20 after said metal scrap has been squashed sideways by the side hydraulic ram in the feed channel 30. According to the present invention, the scrap shearing machine 10 further comprises a downward hydraulic ram 53 and a control unit 70.

The side hydraulic ram 63 is situated adjacent to the mouth 22 of the shear-stand. Moreover, the side hydraulic ram 63 is adapted to squash the metal scrap 35 in front of the mouth 22 only at a certain limited longitudinal section which is shorter than the overall length of the scrap in the longitudinal direction of the feed channel 30 so as to squash the metal scrap to a final width no greater than the inside width of the mouth 22 of the shear-stand.

The downward hydraulic ram 53 is associated with said side hydraulic ram 63 and situated adjacent to the mouth 22 of the shear-stand. The downward hydraulic ram 53 is adapted to downwardly squash the metal scrap 35 in front of the mouth only at a certain limited longitudinal section which is shorter than the overall length of the scrap in the longitudinal direction of the feed channel 30 prior to squashing operation of the side hydraulic ram 63 so as to squash the metal scrap 35 to a final height no greater than the inside height of the mouth 22 of the shear-stand.

Respective drive systems of the shear-stand 20, of the feeder 40, of the side hydraulic ram 63, and of the downward hydraulic ram 53 are associated with the control unit 70 for supervising and controlling them in a predetermined operation sequence.

The scrap shearing machine is suited to shear relatively large, long, and rigid metal scrap, in particular, discarded land vehicles such as railroad coaches including a freight car and a passenger car, large-sized automobiles including a limousine and a heavy-duty truck or architectural scrap including section steels, into a plurality of short scrap pieces. Before placed in the feed channel 30, non-metallic portions are preferably removed from these metal scraps. For example, in the case of a discarded automobile, a seat or interior materials composed of cloth, seat covers, urethane foam, etc. and tires, glass, a plastic bumper, a dashboard, etc. are removed. These non-metallic materials are separated by tearing from the body, etc. Moreover, even in the case of a metallic material, it is preferred that parts made up of spring steel are removed in advance so as not to give an excessive load to the drive systems of the downward hydraulic ram and side hydraulic ram.

The straight-blade shear-stand 20 has a passage formed inside its double housing frame 21. The entrance of the passage forms the mouth 22 of the shear-stand opened in one end face of the feed channel 30. The exit on the other side is opened in a pit 28 for receiving the short scrap pieces after shearing. There are provided, in the midway of the passage, a hydraulic stamper 24, driven by a vertical hydraulic cylinder 23, for holding down the squashed metal scrap and clamping it just before the shears during shearing. The shears are composed of a stationary lower blade 25 arranged on the exit side adjacent to the hydraulic stamper 24 and an upper blade 26 arranged to cooperate with the lower blade 25 to shear the metal scrap into a short scrap piece 36. The upper blade 26 is driven by a main hydraulic cylinder 27 which is installed vertically on the frame 21.

The short scrap piece 36 sheared in the shear-stand 20 falls into the pit 28 provided adjacent to the exit of the shear-stand 20 and is stored there temporarily. The bottom floor of the pit 28 is lower than the upper edge of the lower blade of the shear-stand 20. Moreover, the bottom floor is inclined such that as it departs from the shear-stand, it gradually gets deeper. Therefore, inside the pit 28, the sheared short scrap piece 36 moves away by itself from the proximity of the exit of the shear-stand 20, and it does not stay near the exit.

Except the region where the downward hydraulic ram 53 is arranged, the feed channel 30 is completely opened upward. When the downward hydraulic ram is at an ascent position (initial position), the space below it is also opened with enough height for receiving the unsquashed metal scrap. As shown by dashed lines in FIG. 1, in the feed channel 30, a pair of sheathing boards 31 extending upward along both the sidewalls are provided. In the illustrated embodiment, the feeder 40 comprises a hydraulic pusher. The pusher ram 41 forms part of or all of the tail-end wall face of the feed channel 30. In FIG. 1, numeral 42 denotes a piston rod of the hydraulic cylinder for allowing the pusher ram 41 to reciprocate in the longitudinal direction of the feed channel.

The downward hydraulic ram 53 is driven by the vertical hydraulic cylinder 52 along the true vertical direction which is the same as the working directions of the upper blade and the hydraulic stamper, and the cylinder 52 and the ram 53 constitute a downward hydraulic press unit 50. The downward hydraulic ram 53 and the hydraulic cylinder 52 are supported by a double housing frame 51 which is provided to bridge both the sidewalls of the feed channel 30. The downward hydraulic ram 53 has the same width dimension as the inside width of the feed channel 30. The side hydraulic ram 63 forms one inner wall face covering a certain limited region close to the mouth of the shear-stand in the feed channel 30, and is driven by the horizontal hydraulic cylinder 62 for the squashing operation from that side. The side hydraulic ram 63 and the hydraulic cylinder 62 constitute a side press unit 60.

In the bottom face of the downward hydraulic ram 53 and on the top face of the side hydraulic ram 63, as linear guides for stroke movement of the side hydraulic ram, there are provided mutually slidably fitting linear grooves 54 and linear projections 64.

In the frame 51 of the downward hydraulic press unit, there is provided a closing wall which covers three faces (both the sides faces and the back end face toward the shear-stand) except the feeder 40 side above the upper edge of both the sidewalls of the feed channel 30. Thereby, together with the function of the sheathing boards 31, when the metal scrap is squashed downward, the scrap is prevented from escaping outwards in the working zone beneath the ram 53.

The control unit 70 includes a sequence controller. According to the preset control sequence, the control unit supervises and controls operations, as a whole, of the hydraulic cylinder 23 and the main hydraulic cylinder 27 of the shear-stand 20, the drive cylinder 42 of the feeder 40, the hydraulic cylinder 52 for the downward hydraulic ram 50, and the hydraulic cylinder 62 of the side press unit 60.

The control sequence by the sequence controller includes:

a) a downward press step for driving the downward hydraulic ram 53 to squash the metal scrap in front of the mouth 22 only at a certain limited longitudinal section which is shorter than the overall length of the scrap in the longitudinal direction of the feed channel prior to squashing operation of the side hydraulic ram so as to squash the metal scrap to a final height no greater than the inside height of the mouth 22 of the shear-stand;

b) a side press step for driving the side hydraulic ram 63 to squash the metal scrap in front of the mouth 22 only at the limited longitudinal section which is shorter than the overall length of the scrap in the longitudinal direction of the feed channel after squashing operation of the downward hydraulic ram so as to squash the metal scrap to a final width no greater than the inside width of the mouth 22 of the shear-stand;

c) a feeding step for driving the feeder 40 to feed the metal scrap toward the mouth 22 of the shear-stand after the metal scrap has been squashed both downward and sideways in the feed channel 30; and e) a shearing step for driving scrap shears of the shear-stand 20 to cut the front end portion of the metal scrap fed to the mouth 22 of the shear-stand into a short scrap piece 36.

Figure 5A:
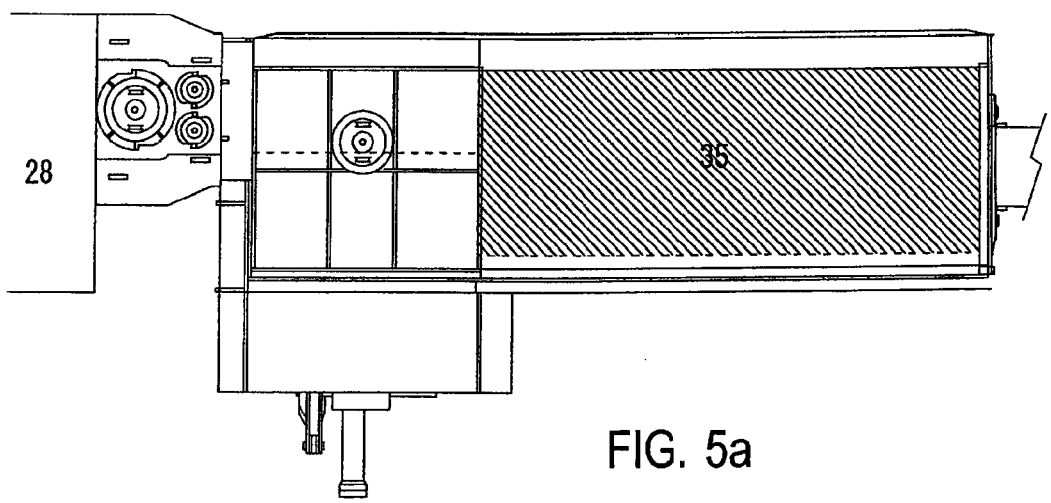
FIG. 5a is a schematic plan view of the machine of FIG. 1 when the control sequence is started.

In FIGS. 5a to 5f, states of the scrap shearing machine in various steps of operation according to the control sequence are shown. In FIG. 5a, as shown by parallel crossed lines, a large metal scrap 35 is placed in the feed channel 30. When this is checked by a worker, a start command is given to the control unit 70.

Figure 5B:
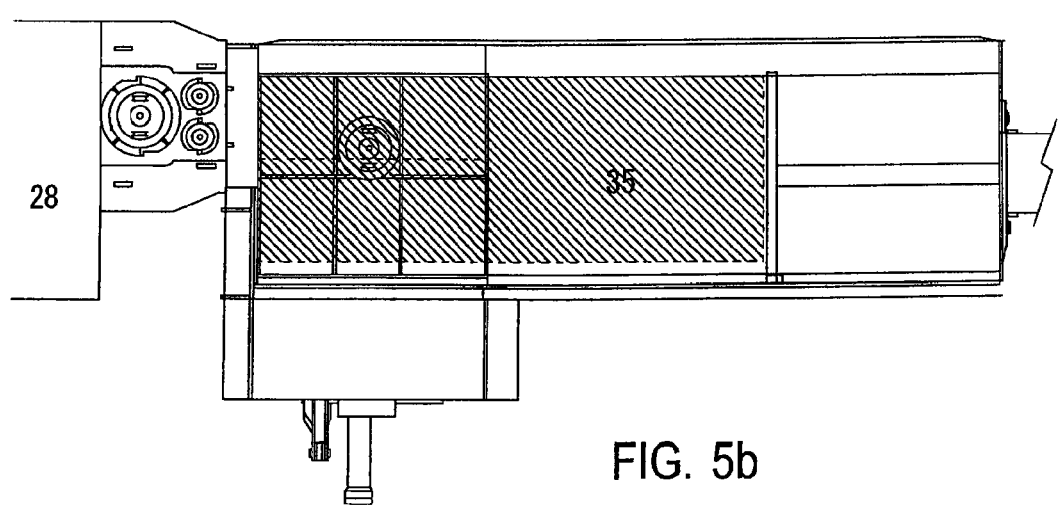
FIG. 5b is a schematic plan view of the machine of FIG. 1 when the first downward press step is started.

In FIG. 5b, the metal scrap 35 is pushed toward the shear-stand 20 through the initial operation of the feeder 40 by the control unit 70. The change in the driving torque (load torque) of the feeder 40 when the front end of the metal scrap comes in contact with the end surface of the feed channel in front of the mouth 22 of the shear-stand 20 is detected by a load sensor. Based on the detection result, the control sequence by the control unit 70 is changed to the downward press step, and the downward press step by the downward hydraulic ram 53 is started.

Figure 5C:
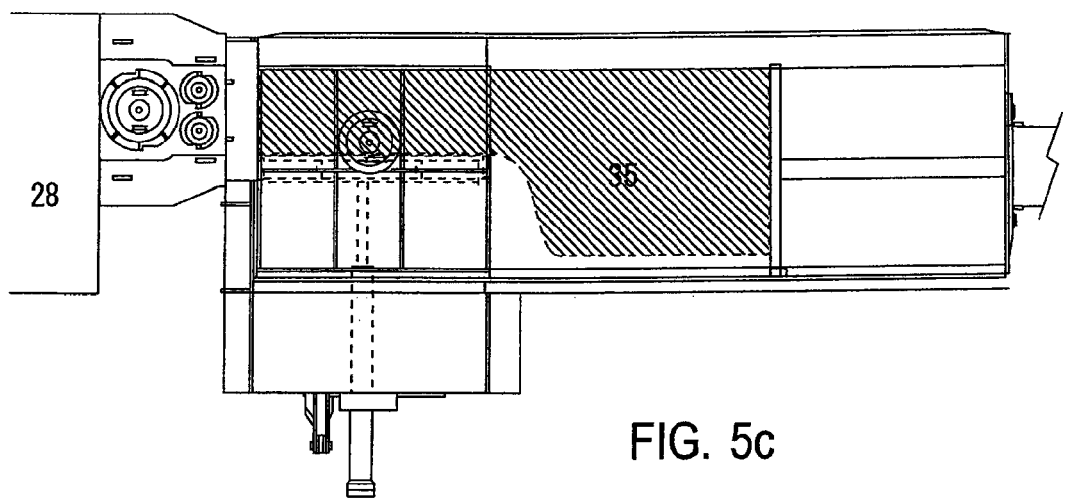
FIG. 5c is a schematic plan view of the machine of FIG. 1 when the first side press step is completed.

In FIG. 5c, the downward press step by the downward hydraulic ram 53 is completed. Subsequently, the side press step by the side hydraulic ram 63 is performed. The side press step is completed when the side hydraulic ram 63 reaches the stroke end set in advance. When a signal indicating the completion of the side press step is given to the control unit 70, the side hydraulic ram 63 and the downward hydraulic ram 53 are sequentially returned to respective initial positions.

Figure 5D:
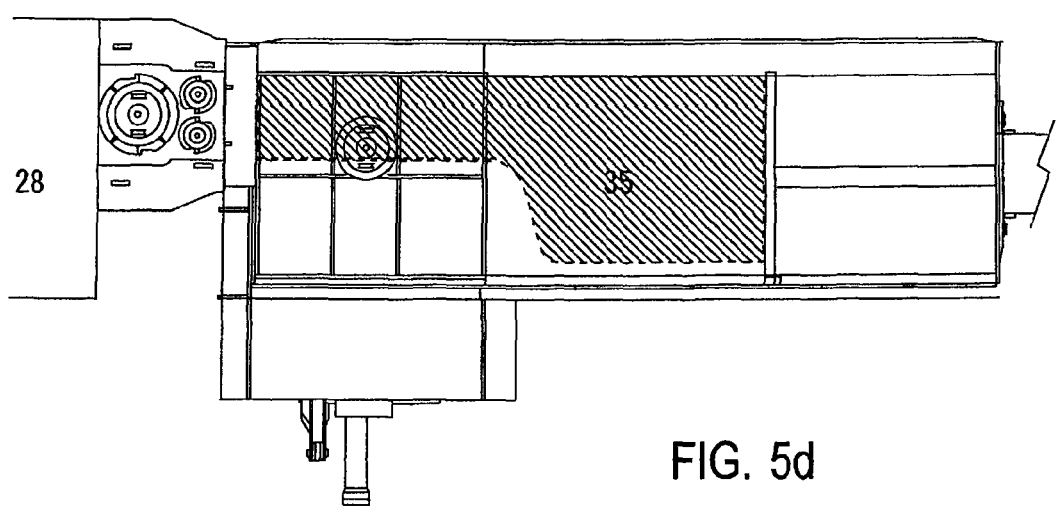
FIG. 5d is a schematic plan view of the machine of FIG. 1 when the feeding step is ready to restart.

In FIG. 5d, each hydraulic ram has been returned to its initial position and the feeding step by the feeder 40 restart.

Figure 5E:
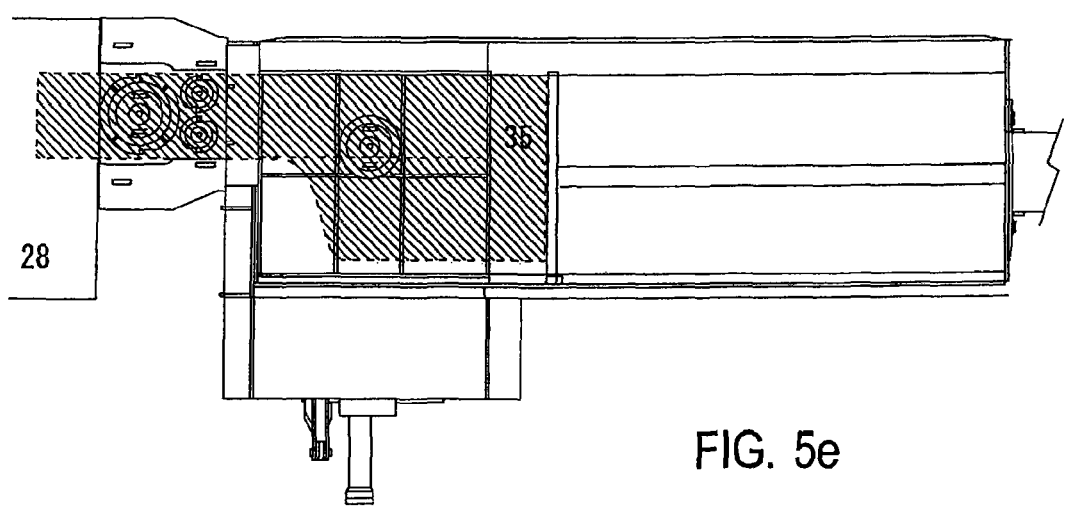
FIG. 5e is a schematic plan view of the machine of FIG. 1 when the shearing step is ready to start.
Figure 5F:
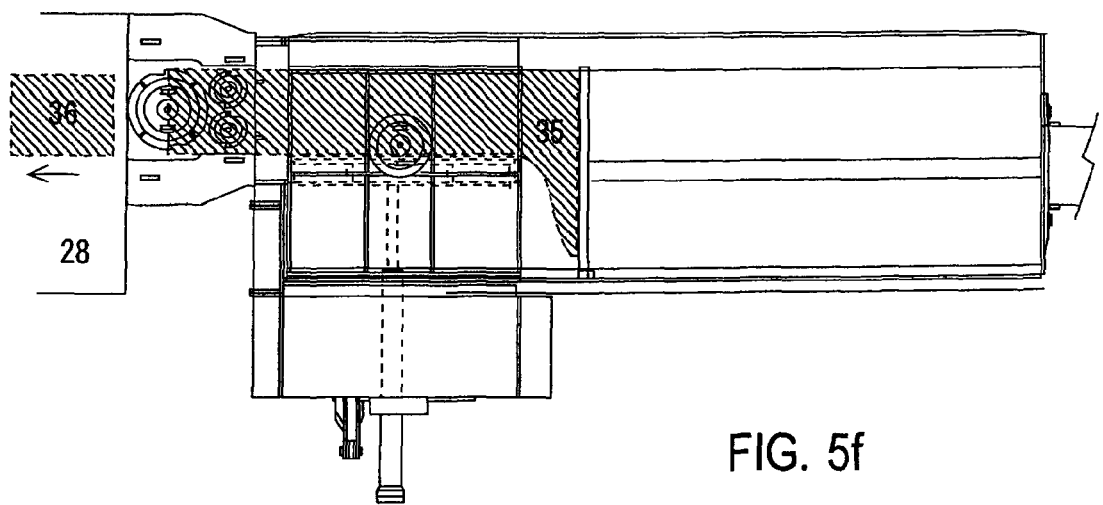
FIG. 5f is a schematic plan view of the machine of FIG. 1 when the first shearing step is completed and the subsequent downward and side press steps are performed.

With respect to the feed amount of the metal scrap caused by the feeder 40, the moving distance of the pusher ram 41 is measured and counted during the feeding step. When the counted value reaches a predetermined threshold value which is preset in accordance with the design specification of the shear-stand 20, it is learned that the squashed front portion of the metal scrap 35 has exceeded the position of the blades 25 and 26 by the predetermined length corresponding to a dimension of the short scrap piece to be sheared (FIG. 5e). At this time, a corresponding signal is given to the control unit 70 and, thereby, the hydraulic stamper 24 of the shear-stand 20 is activated and the squashed front portion of the metal scrap is downwardly clamped in close proximity to the shear blades. Subsequently, the main hydraulic cylinder 27 is driven to execute shearing (FIG. 5f).

Hereafter, feeding of the metal scrap by the feeder 40 and cutting of the metal scrap into the short scrap piece 36 by the shear-stand 20 are repeated. When the shearing of the squashed front portion by first downward and side press steps is over, the sequential operation is repeated again from the feeding step followed by the downward and sideway press steps until the full length of the metal scrap 35 placed in the feed channel 30 is sheared into the short pieces.

Although FIGS. 5a to 5f show that the shearing step is performed about three times for each of the downward and side press steps, the present invention is not limited thereto, and any modification may be adopted within the scope of the invention.

The short scrap piece 36 emerged from the exit of the shear-stand is substantially in the shape of a cube, which can efficiently be transferred by the motor truck or railroad freight car. The short scrap pieces are transported to a recycling facility to efficiently sort and collect the resource materials.

The invention claimed is:

1. A scrap shearing machine for shearing a metal scrap into a plurality of short scrap pieces, comprising:
   an open feed channel having two opposite sidewalls to form a rectangular parallelepiped space;
   a straight-blade shear-stand which is disposed at one end of the feed channel, and which has a pair of blades arranged to cooperate with each other to shear the metal scrap, and a mouth narrower than an inside width of the feed channel between said sidewalls;
   a downward hydraulic ram for downwardly squashing the metal scrap in the feed channel;
   a side hydraulic ram for moving at least one of said sidewalls towards the other of said sidewalls whereby the metal scrap placed in the feed channel can be squashed sideways before feeding the metal scrap into the mouth of the shear-stand;
   a feeder for feeding the metal scrap into the mouth of the shear-stand after said metal scrap has been squashed sideways by the side hydraulic ram in the feed channel; and
   a control unit which controls respective drive systems of the shear-stand, the feeder, the side hydraulic ram, and the downward hydraulic ram, in accordance with a predetermined operation sequence;
   wherein said side hydraulic ram is situated adjacent to the mouth of the shear-stand and is arranged to squash the metal scrap in front of the mouth only at a certain limited longitudinal section which is shorter than the overall length of the scrap in the longitudinal direction of the feed channel so as to squash the metal scrap to a final width no greater than the inside width of the mouth; and
   wherein said downward hydraulic ram has a same width dimension as the inside width of the feed channel, and said downward hydraulic ram is associated with said side hydraulic ram adjacent to the mouth of the shear-stand and is arranged to downwardly squash the metal scrap in front of the mouth only at a certain limited longitudinal section which is shorter than the overall length of the scrap in the longitudinal direction of the feed channel so as to squash the metal scrap to a final height no greater than the inside height of the mouth of the shear-stand; and
   wherein the control unit controls said downward hydraulic ram to downwardly squash the metal scrap prior to a squashing operation of said side hydraulic ram.

2. The scrap shearing machine according to claim 1,
wherein the downward hydraulic ram is driven by a vertical hydraulic cylinder and the side hydraulic ram is driven by a horizontal hydraulic cylinder; and
wherein linear guides which slidably fit with each other are provided on a bottom face of the downward hydraulic ram and on a top face of the side hydraulic ram.

3. The scrap shearing machine according to claim 1, wherein the feeder comprises a hydraulic pusher which reciprocates from a tail end face of the feed channel to the mouth of the shear-stand, and vice versa.

4. The scrap shearing machine according to claim 1, further comprising a pair of sheathing boards which extend upward along the respective sidewalls of the feed channel.

5. The scrap shearing machine according to claim 1, wherein the control unit includes a sequence controller which has a control sequence to sequentially repeat operations comprising:
   a) driving the downward hydraulic ram to squash the metal scrap in front of the mouth only at a certain limited longitudinal section which is shorter than the overall length of the scrap in the longitudinal direction of the feed channel prior to the squashing operation of the side hydraulic ram so as to squash the metal scrap to a final height no greater than the inside height of the mouth of the shear-stand;
   b) driving the side hydraulic ram to squash the metal scrap in front of the mouth only at the limited longitudinal section which is shorter than the overall length of the scrap in the longitudinal direction of the feed channel after the squashing operation of the downward hydraulic ram so as to squash the metal scrap to a final width no greater than the inside width of the mouth of the shear-stand;
   c) driving the feeder to feed the metal scrap toward the mouth of the shear-stand after the metal scrap has been squashed both downward and sideways in the feed channel; and
   e) driving the shear-stand to cut the front end portion of the metal scrap fed to the mouth of the shear-stand into a short scrap piece.

6. The scrap shearing machine according to claim 5, wherein the control unit measures the driving torque of the feeder during the operation c); and wherein the control sequence is started from the operation a) when the measured driving torque exceeds the predetermined threshold value.

7. The scrap shearing machine according to claim 5, wherein the control unit measures a feed amount of movement of the metal scrap by the feeder prior to the end of the operation e); and wherein the sequence controller of the control unit restarts operation a) when the measured feed amount reaches the longitudinal dimension of said certain limited longitudinal section.

8. The scrap shearing machine according to claim 5, wherein the control unit detects the descent position of the downward hydraulic ram during the operation a); and
   wherein the sequence controller changes the control sequence from the operation a) to the operation b) when the detected descent position reaches a predetermined height position lower than the upper-edge height of the mouth of the shear-stand.

9. The scrap shearing apparatus according to claim 5, wherein the control unit monitors an arrival of the side hydraulic ram at a forward stroke end thereof during the operation b), said forward stroke end being selected to an inner position of the inside width of the mouth of the shear-stand; and
   wherein when the side hydraulic ram arrives at the forward stroke end thereof, the side hydraulic ram and the downward hydraulic ram are sequentially returned to respective initial positions whereby the sequence controller changes the control sequence sequentially to the operation c).

* * * * *